US012790566B2

(12) United States Patent
Vockenroth et al.

(10) Patent No.: US 12,790,566 B2
(45) Date of Patent: Nov. 10, 2026

(54) CONCENTRATED FLOWABLE DETERGENT PREPARATION HAVING IMPROVED PROPERTIES

(71) Applicant: Henkel AG & Co. KGaA, Duesseldorf (DE)

(72) Inventors: Inga Kerstin Vockenroth, Duesseldorf (DE); Barbara Busch, Neuss (DE)

(73) Assignee: Henkel AG & Co. KGaA, Düsseldorf (DE)

( * ) Notice: Subject to any disclaimer, the term of this patent is extended or adjusted under 35 U.S.C. 154(b) by 332 days.

(21) Appl. No.: 18/125,987

(22) Filed: Mar. 24, 2023

(65) Prior Publication Data

US 2023/0227753 A1 Jul. 20, 2023

Related U.S. Application Data

(63) Continuation of application No. PCT/EP2021/072602, filed on Aug. 13, 2021.

(30) Foreign Application Priority Data

Sep. 25, 2020 (DE) ......................... 102020212090.0

(51) Int. Cl.

| | |
|---|---|
| ***C11D 1/86*** | (2006.01) |
| ***C11D 1/14*** | (2006.01) |
| ***C11D 1/22*** | (2006.01) |
| ***C11D 17/04*** | (2006.01) |
| *C11D 1/44* | (2006.01) |
| *C11D 1/48* | (2006.01) |
| *C11D 1/72* | (2006.01) |

(52) U.S. Cl.

CPC .............. *C11D 1/86* (2013.01); *C11D 17/043* (2013.01); *C11D 1/146* (2013.01); *C11D 1/22* (2013.01); *C11D 1/44* (2013.01); *C11D 1/48* (2013.01); *C11D 1/72* (2013.01); *C11D 2111/12* (2024.01)

(58) Field of Classification Search

CPC ..... C11D 1/86; C11D 17/043; C11D 2111/12; C11D 1/146; C11D 1/22; C11D 1/44; C11D 1/72

See application file for complete search history.

(56) References Cited

U.S. PATENT DOCUMENTS

| | | | |
|---|---|---|---|
| 9,850,452 B2 | 12/2017 | Fossum et al. | |
| 10,414,719 B2 | 9/2019 | Ebert et al. | |
| 2014/0296127 A1 | 10/2014 | Hulskotter et al. | |
| 2015/0275142 A1 | 10/2015 | Hulskotter et al. | |
| 2016/0090552 A1 | 3/2016 | Loughnane et al. | |
| 2016/0340619 A1* | 11/2016 | Scheibel .................. | C11D 1/22 |

FOREIGN PATENT DOCUMENTS

| | | |
|---|---|---|
| DE | 102011089948 A1 | 6/2013 |
| EP | 3617297 A1 | 3/2020 |

OTHER PUBLICATIONS

PCT International Search Report—WO PCT/EP2021/072602—Completed: Nov. 12, 2021 Mailing date: Nov. 22, 2021; pp. 16.

* cited by examiner

*Primary Examiner* — Angela C Brown-Pettigrew
(74) *Attorney, Agent, or Firm* — Blank Rome LLP

(57) ABSTRACT

A flowable detergent preparation including, based on the total weight thereof, a) 0.5 to 10 wt. % of a polyalkoxylated amine having a weight-average molecular weight Mw in the range of 600 g/mol to 10000 g/mol, which is obtainable by reacting ammonia or primary alkyl or hydroxyalkylamines having a molecular weight less than 200 g/mol, with alkylene oxides; b) 0.5 to 5 wt. % polyalkoxylated polyalkyleneimine, which is obtainable by reacting polyalkyleneimines with alkylene oxides; c) 5 to 15 wt. % alkyl ether sulfate; and a textile washing method using these detergent preparations.

20 Claims, No Drawings

CONCENTRATED FLOWABLE DETERGENT PREPARATION HAVING IMPROVED PROPERTIES

FIELD OF INVENTION

The present invention relates to a surfactant and polymer-based highly concentrated detergent preparation. Furthermore, the application relates to detergent portion units which comprise this detergent preparation, and to a method for washing textiles using the detergent preparation or the detergent portion unit.

BACKGROUND

Continuously changing requirements are imposed on the forms of manufacture and supply of detergent and cleaning agents. In this case, a main focus has, for quite some time, been on the convenient metering of detergent and cleaning agents by the consumer and the simplification of the work steps necessary for carrying out a washing or cleaning method. A technical solution is provided by pre-portioned detergent or cleaning agents, for example film pouches comprising one or more receiving chambers for solid or liquid detergent or cleaning agents.

A trend relevant to the production of these film pouches is the miniaturization of these film pouches. In addition to higher consumer acceptance due to simplified handling, the background of this development is, in particular, sustainability aspects, for example in relation to transport volumes and costs and the quantity of packaging materials used.

The concentration of modern detergents, in particular modern liquid detergents, generally influences their optical and rheological properties, has effects on the storage stability of these agents, and can influence their cleaning performance, in particular when the high concentration of the active substances leads to incompatibilities.

The international application WO 2016/191238 A1 describes textile detergents which contain ethoxylated polyethyleneimine and alkyl ether sulfate.

SUMMARY OF THE INVENTION

The object of the application was to provide visually appealing, concentrated flowable detergent preparations which can be produced in a simple and efficient manner, have a good storage life, and are characterized in particular by good cleaning results. In particular, the detergent preparation should be able to be prepared in water-soluble portion sachets and to a large extent based on ingredients which can be produced at least in part from renewable raw materials.

DETAILED DESCRIPTION OF THE INVENTION

A first subject matter of the application is a flowable detergent preparation including, based on the total weight thereof, a) 0.5 to 10 wt. % of a polyalkoxylated amine having a weight-average molecular weight My, in the range from 600 g/mol to 10000 g/mol, which is obtainable by reacting ammonia or primary alkyl or hydroxyalkylamines having a molecular weight of less than 200 g/mol with alkylene oxides;

b) 0.5 to 5 wt. % polyalkoxylated polyalkyleneimine obtainable by reacting polyalkyleneimines with alkylene oxides;

c) 5 to 15 wt. % alkyl ether sulfate.

The detergent preparation is flowable under standard conditions (20° C., 1013 mbar).

A first essential component of the detergent preparation is a specific polyalkoxylated amine at a proportion by weight of 0.5 to 10 wt. %. Preferred detergent preparations contain, based on their total weight, 1 to 8 wt. %, preferably 3 to 6 wt. %, polyalkoxylated amine. Corresponding weight portions have proven advantageous for the storage life, but in particular for the cleaning performance.

Preferred polyalkoxylated amines have a weight-average molecular weight $M_w$ in the range from 1300 g/mol to 6000 g/mol, in particular from 1400 g/mol to 4500 g/mol. (The average molecular weights indicated here, and later optionally for other polymers, are weight-average molecular weights $M_w$ which can in principle be determined by means of gel permeation chromatography with the aid of an RI detector, the measurement expediently being carried out against an external standard.) For their preparation, it is possible to start, in a known manner, from ammonia, a monoalkylamine, a monoalkylaminoamine or a monoalkyldialkanolamine or a mono-, di- or trialkanolamine, for example triethanolamine, methyl-, ethyl-, propyl- and isopropyl-diethanolamine, methyl-, ethyl-, propyl- and isopropyl-diisopropanolamine, tripropanolamine, triisopropanolamine, N,N-Di-(2-hydroxyethyl)cyclohexylamine, N,N-Di-(2-hydroxypropyl)cyclohexylamine, n-butylamine, n-hexylamine, n-octylamine, isopropylamine, sec-butylamine, tert-butylamine, cyclohexylamine, 2-ethylhexylamine, 2-phenylethylamine and mixtures thereof, which is reacted with an alkylene oxide, in particular selected from the group consisting of ethylene oxide, propylene oxide, butylene oxide and mixtures thereof, in particular with a mixture including propylene oxide and preferably ethylene oxide, particularly preferably with propylene oxide. The polyalkoxylated amines thus obtainable may be block or random structures. Particular preference is given, inter alia, to a polyalkoxylated amine obtainable by propoxylation of triethanolamine, preferably having a length of the three side arms of 15 propylene oxide units in each case. Also preferred is a polyalkoxylated amine obtainable by propoxylation of triisopropanolamine, preferably having a length of the three side arms of 15 propylene oxide units in each case. Polyalkoxylated monoalkylamines having a linear, branched or cyclic alkyl group are likewise suitable, an alkylene oxide selected from the group consisting of ethylene oxide, propylene oxide, butylene oxide and mixtures thereof being alkoxylated, preferably with a mixture comprising propylene oxide, more preferably with propylene oxide. Preference is also given to a polyalkoxylated amine obtainable by propoxylation of tert-butylamine, preferably having a length of the two side arms of 12 propylene oxide units in each case.

Preferred polyalkoxylated amines satisfy the general formula (I), (I)

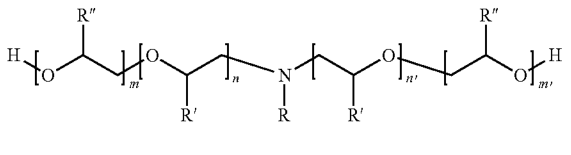

in which R represents a linear, optionally branched or optionally cyclic alkyl group having 1 to 12 C atoms, or a group $—(CH_2CHR'O)_{n''}—(CH_2CHR''O)_{m''}—H$, R' and R" are, independently of one another, H, $CH_3$ or $CH_2CH_3$, n, n' and n" are, independently of one another, numbers from 0 to 30, preferably from 0 to 10 and in particular 0 to 5, and m, m' and m" are, independently of one another, numbers from 0 to 30, preferably from 5 to 20 and in particular from 12 to 16, with the proviso that the sum n+n'+n"+m+m'+m" is at least 14, preferably in the range from 18 to 100, and in particular in the range from 20 to 70. Preferably, in the compounds of the formula I, at least one of the functional groups R' and R" is a $CH_3$ group.

As a second essential component, the detergent preparation includes a polyalkoxylated polyalkyleneimine. Due to their cleaning performance, particularly preferred detergent preparations contain, based on their total weight, 1 to 4 wt. %, preferably 2 to 3 wt. %, polyalkoxylated polyalkyleneimine.

The polyalkoxylated polyalkyleneimine is a polymer having a polyalkyleneimine backbone which carries polyalkoxy groups on the N atoms. It preferably has a weight-average molecular weight Mw in the range from 5000 g/mol to 60000 g/mol, in particular from 10000 g/mol to 22500 g/mol. The polyalkyleneimine has primary amino functions at the ends and preferably both secondary and tertiary amino functions in the interior, and optionally it can also have only secondary amino functions in the interior, such that the result is not a branched-chain but a linear polyalkyleneimine. The ratio of primary to secondary amino groups in the polyalkyleneimine is preferably in the range from 1:0.5 to 1:1.5, in particular in the range from 1:0.7 to 1:1. The ratio of primary to tertiary amino groups in the polyalkyleneimine is preferably in the range from 1:0.2 to 1:1, in particular in the range from 1:0.5 to 1:0.8. The polyalkyleneimine preferably has a weight-average molecular weight in the range from 500 g/mol to 50000 g/mol, in particular from 550 g/mol to 2000 g/mol. The N atoms in the polyalkyleneimine are preferably separated from one another by alkylene groups having 2 to 12 C atoms, in particular 2 to 6 C atoms, not all alkylene groups having to have the same number of C atoms. Particular preference is given to ethylene groups, 1,2-propylene groups, 1,3-propylene groups and mixtures thereof. The primary amino functions in the polyalkyleneimine can carry 1 or 2 polyalkoxy groups and the secondary amino functions can carry 1 polyalkoxy group, not every amino function having to be alkoxy group-substituted. The average number of alkoxy groups per primary and secondary amino function in the polyalkoxylated polyalkenimine is preferably 5 to 100, in particular 10 to 50. The alkoxy groups in the polyalkoxylated polyalkyleneimine are preferably ethoxy, propoxy or butoxy groups or mixtures thereof. Polyethoxylated polyethyleneimines are particularly preferred. The polyalkoxylated polyalkyleneimines are obtainable by reacting the polyalkyleneimines with epoxides corresponding to the alkoxy groups. If desired, the terminal OH function of at least some of the polyalkoxy substituents can be replaced by an alkyl ether function having 1 to 10, in particular 1 to 3, C atoms.

For the cleaning performance of the detergent preparations, it has proven advantageous if the weight ratio of polyalkoxylated amine to polyalkoxylated polyalkyleneimine is 10:1 to 1:3, preferably 3.1 to 1:1.

Anionic surfactants from the group of the alkyl ether sulfates are the third essential constituent of the detergent composition. Their proportion by weight of the total weight of the detergent composition is 5 to 15 wt. %, preferably 6 to 13 wt. %, and in particular 7 to 11 wt. %.

Preferred alkyl ether sulfates are in particular fatty alcohol ether sulfates from the group of sulfuric acid monoesters of straight-chain or branched $C_7$-$C_{21}$ alcohols ethoxylated with 1 to 6 mol ethylene oxide, such as 2-methyl-branched $C_{9-11}$-alcohols having an average of 3.5 mol ethylene oxide (EO), or $C_{12-18}$ fatty alcohols having 1 to 4 EO, are suitable. Alkyl ether sulfates of formula (II) are preferred $$R^1—O-(AO)_n—SO_3^-X^+ \qquad (II)$$

In this formula (II), $R^1$ is a linear or branched, substituted or unsubstituted alkyl functional group, preferably a linear, unsubstituted alkyl functional group, particularly preferably a fatty alcohol functional group. Preferred $R^1$ functional groups of formula (II) are selected from decyl, undecyl, dodecyl, tridecyl, tetradecyl, pentadecyl, hexadecyl, heptadecyl, octadecyl, nonadecyl, eicosyl functional groups and the mixtures thereof, the representatives having an even number of C atoms being preferred. Particularly preferred $R^1$ functional groups of formula (II) are derived from fatty alcohols having 12 to 18 C atoms, for example from coconut fatty alcohol, tallow fatty alcohol, lauryl, myristyl, cetyl or stearyl alcohol, or from oxo alcohols having 10 to 20 C atoms.

AO in formula (II) represents an ethylene oxide (EO) or propylene oxide (PO) group, preferably an ethylene oxide group. The index n of formula (II) is an integer from 1 to 50, preferably from 1 to 20, and in particular from 2 to 10. Very particularly preferably, n is 2, 3, 4, 5, 6, 7 or 8. X is a monovalent cation or the nth part of an n-valent cation; in this case the alkali metal ions, including $Na^+$ or $K^+$ and the amines, are preferred, $Na^+$ and primary and secondary amines, in particular monoethanolamine, being extremely preferred. Further cations X+ may be selected from NH4+, ½ $Zn^{2+}$, ½ $Mg^{2+}$, ½ $Ca^{2+}$, ½ $Mn^{2+}$ and the mixtures thereof.

Particularly preferred compositions contain an alkyl ether sulfate selected from fatty alcohol ether sulfates of formula (II) with $R^1$=linear C12-18 alkyl, n=2, 3, 4, 5, 6, 7 or 8, and $X^+$=$Na^+$ or $HOCH_2CH_2NH_3^+$. Very particularly preferred representatives are Na fatty alcohol ether sulfates or monoethanolamine fatty alcohol sulfates having 12 to 18 C atoms and 2 EO ($R^1$=linear C12-18 alkyl, n=2 in formula II).

The degree of ethoxylation indicated represents a statistical average value which can be an integer or a fractional number for a specific product. The degrees of alkoxylation indicated represent statistical averages which can be an integer or a fractional number for a specific product. Preferred alkoxylates/ethoxylates have a narrowed homolog distribution (narrow range ethoxylates, NRE).

In addition to the above-described alkyl ether sulfates, the detergent preparation can contain further anionic surfactants. The group of these further surfactants includes, for example, $C_{8-18}$-alkylbenzene sulfonates, in particular the $C_9$-$C_{13}$-alkylbenzene sulfonates, olefin sulfonates, C12-C18 alkane sulfonates, ester sulfonates, alk(en)yl sulfates, and mixtures thereof.

For the cleaning effect of the detergent compositions, it has surprisingly proven advantageous if these, based on their total weight, contain less than 10 wt. %, preferably less than 5 wt. %, and in particular less than 2 wt. % $C_{8-18}$-alkylbenzene sulfonates, in particular $C_9$-$C_{13}$-alkylbenzene sulfonates. Low weight portions of alkylbenzene sulfates are therefore preferred.

The use of fatty acids has proven advantageous for stability and cleaning performance. Preferred detergent preparations therefore contain, based on the total weight thereof, 4 to 12 wt. %, preferably 6 to 10 wt. %, fatty acid. Particularly preferred fatty acids are selected from the group of caprylic acid, capric acid, lauric acid, myristic acid, palmitic acid, stearic acid, oleic acid, linoleic acid and mixtures thereof. In the context of the application, the fatty acids are added to the group of anionic surfactants.

In a further technically advantageous variant, the detergent preparation includes, based on its total weight, 12 to 28 wt. %, preferably 15 to 25 wt. %, non-ionic surfactant.

Preferred non-ionic surfactants are selected from the group of ethoxylated primary $C_{8-18}$-alcohols, preferably the ethoxylated primary $C_{8-18}$-alcohols having a degree of alkoxylation of ≥4, particularly preferably the $C_{12-14}$-alcohols having 4 EO or 7 EO, the $C_{9-11}$-alcohols having 7 EO, the $C_{13-15}$-alcohols having 5 EO, 7 EO or 8 EO, the $C_{13-15}$-oxo alcohols having 7 EO, the $C_{12-18}$-alcohols having 5 EO or 7 EO, in particular the $C_{12-18}$-fatty alcohols having 7 EO, or the $C_{13-18}$-oxo alcohols having 7 EO.

With regard to the rheological properties of the detergent preparation, the processability and cleaning effect thereof, it has proven advantageous to use anionic surfactant and non-ionic surfactant in a weight ratio of from 4:1 to 1:1, preferably from 3:1 to 2:1.

Preferred detergent preparations contain, based on their total weight, 15 to 45 wt. %, preferably 25 to 45 wt. %, solvent. The solvent may be water, organic solvents or aqueous-organic solvent systems. The use of aqueous-organic solvent systems has proven to be particularly advantageous for the manufacturability and storage life, and is therefore preferred.

In a preferred embodiment, the detergent preparation includes, based on its total weight, 15 to 40 wt. %, preferably 20 to 35 wt. %, organic solvent.

Preferred organic solvents are selected from the group of ethanol, n-propanol, propanol, butanols, glycol, propanediol, butanediol, methylpropanediol, glycerol, diglycol, propyl diglycol, butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether, propylene glycol propyl ether, dipropylene glycol monomethyl ether, dipropyl glycol monoethyl ether, methoxytriglycol, ethoxytriglycol, butoxytriglycol, 1-butoxyethoxy-2-propanol, 3-methyl-3-methoxybutanol, propylene glycol tert-butyl ether, di-n-octyl ether and mixtures thereof, preferably from the group of propanediol, glycerol, ethanol and mixtures thereof.

The water content of preferred detergent preparations is 5 to 18 wt. %, in particular 7 to 12 wt. %, based on the total weight thereof.

Preferred detergent preparations contain an ethoxylated polyethyleneimine. Preferred ethoxylated polyethyleneimines are non-ionic, i.e. do not have any quaternary nitrogen atoms or other ionic groups than those produced by protonation of the nitrogen atoms which is influenced by pH value. Preferably, the ethoxylated polyethyleneimine comprises a polyethyleneimine backbone which has been modified by ethoxylation, the ethoxylated polyethyleneimine having a weight-average molecular weight $M_w$ in the range from 300 g/mol to 10000 g/mol.

Preferred detergent preparations contain, as a further optional constituent, 2 to 8 wt. %, preferably 3 to 6 wt. %, enzyme preparation.

In addition to the actual enzyme protein, an enzyme preparation comprises further components such as enzyme stabilizers, carrier materials or fillers. In this case, the enzyme protein typically forms only a fraction of the total weight of the enzyme preparation. Enzyme preparations which are preferably used contain between 0.1 and 40 wt. %, preferably between 0.2 and 30 wt. %, more preferably between 0.4 and 20 wt. %, and most preferably between 0.8 and 10 wt. % of the enzyme protein. In such compositions, an enzyme stabilizer can be contained in an amount of 0.05 to 35 wt. %, preferably 0.05 to 10 wt. %, based on the total weight in the enzyme composition.

The protein concentration can be determined using known methods, for example the BCA method (bicinchoninic acid; 2,2'-bichinolyl-4,4'-dicarboxylic acid) or the Biuret method. The active protein concentration is determined in this regard via titration of the active centers using a suitable irreversible inhibitor (for proteases, for example, phenylmethylsulfonylfluoride (PMSF)), and determination of the residual activity.

As a further preferred optional constituent, a preferred detergent composition comprises 0.2 to 4 wt. %, preferably 0.5 to 3 wt. %, fragrance preparation.

In addition to the actual fragrances, the fragrance preparation comprises solvents, solid carrier materials or stabilizers, for example.

A fragrance is a chemical substance that stimulates the sense of smell. In order to be able to stimulate the sense of smell, the chemical substance should be able to be distributed in the air, at least in part, i.e. the fragrance should be volatile at 25° C., at least to a small degree. If the fragrance is very volatile, the odor intensity then decreases rapidly again. In the case of a lower volatility, however, the odor impression is more sustainable, i.e. it does not disappear as quickly. In one embodiment, the fragrance therefore has a melting point which is in the range from −100° C. to 100° C., preferably from −80° C. to 80° C., more preferably from −20° C. to 50° C., in particular from −30° C. to 20° C. In a further embodiment, the fragrance has a boiling point which is in the range from 25° C. to 400° C., preferably from 50° C. to 380° C., more preferably from 75° C. to 350° C., in particular from 100° C. to 330° C.

Overall, a chemical substance should not exceed a particular molecular mass in order to act as a fragrance, since the required volatility can no longer be ensured at too high a molecular mass. In one embodiment, the fragrance has a molecular mass of 40 to 700 g/mol, more preferably of 60 to 400 g/mol.

The odor of a fragrance is perceived as pleasant by most people, and frequently corresponds to the odor of, for example, flowers, fruits, spices, bark, resin, leaves, grasses, mosses and roots. Thus, fragrances can also be used to mask unpleasant odors or else to provide a non-smelling substance with a desired odor. Individual fragrance compounds, for example the synthetic products of the ester, ether, aldehyde, ketone, alcohol and hydrocarbon types, can be used as fragrances.

Preferably, mixtures of different fragrances are used, which together produce an attractive fragrance note. Such a mixture of fragrances can also be referred to as perfume or perfume oil. Perfume oils of this kind can also contain natural fragrance mixtures, as are obtainable from plant sources.

For the lengthening of the fragrance effect, it has proven advantageous to encapsulate the fragrance. In a corresponding embodiment, at least a portion of the fragrance is used in encapsulated form (fragrance capsules), in particular in microcapsules. However, the entire fragrance can also be used in encapsulated form. The microcapsules may be water-soluble and/or water-insoluble microcapsules. For example, melamine-urea-formaldehyde microcapsules, melamine-formaldehyde microcapsules, urea-formaldehyde microcapsules or starch microcapsules can be used. “Fragrance precursor” refers to compounds which release the actual fragrance only after chemical conversion/cleavage, typically by the action of light or other ambient conditions, such as pH, temperature, etc. Such compounds are often also referred to as “pro-fragrances”.

The composition of some preferred flowable detergent preparations can be found in the following tables (information in wt. % based on the total weight of the preparation, unless otherwise indicated).

| | Formula 1 | Formula 2 | Formula 3 | Formula 4 |
|---|---|---|---|---|
| polyalkoxylated amine [1)] | 0.5 to 10 | 1 to 8 | 1 to 8 | 3 to 6 |
| polyalkoxylated polyalkyleneimine [2)] | 0.5 to 5 | 1 to 4 | 1 to 4 | 2 to 3 |

-continued

| | Formula 1 | Formula 2 | Formula 3 | Formula 4 |
|---|---|---|---|---|
| alkylether sulfate | 5 to 15 | 5 to 15 | 6 to 13 | 7 to 11 |
| misc | up to 100 | up to 100 | up to 100 | up to 100 |

| | Formula 6 | Formula 7 | Formula 8 | Formula 9 |
|---|---|---|---|---|
| polyalkoxylated amine [1)] | 0.5 to 10 | 1 to 8 | 1 to 8 | 3 to 6 |
| polyalkoxylated polyalkyleneimine [2)] | 0.5 to 5 | 1 to 4 | 1 to 4 | 2 to 3 |
| alkylether sulfate | 5 to 15 | 5 to 15 | 6 to 13 | 7 to 11 |
| $C_{8-18}$ alkyl benzene sulphonate | <10 | <5 | <5 | <2 |
| misc | up to 100 | up to 100 | up to 100 | up to 100 |

| | Formula 11 | Formula 12 | Formula 13 | Formula 14 |
|---|---|---|---|---|
| polyalkoxylated amine [1)] | 0.5 to 10 | 1 to 8 | 1 to 8 | 3 to 6 |
| polyalkoxylated polyalkyleneimine [2)] | 0.5 to 5 | 1 to 4 | 1 to 4 | 2 to 3 |
| alkylether sulfate | 5 to 15 | 5 to 15 | 6 to 13 | 7 to 11 |
| non-ionic surfactant | 12 to 28 | 12 to 28 | 12 to 28 | 15 to 25 |
| misc | up to 100 | up to 100 | up to 100 | up to 100 |

| | Formula 16 | Formula 17 | Formula 18 | Formula 19 |
|---|---|---|---|---|
| polyalkoxylated amine [1)] | 0.5 to 10 | 1 to 8 | 1 to 8 | 3 to 6 |
| polyalkoxylated polyalkyleneimine [2)] | 0.5 to 5 | 1 to 4 | 1 to 4 | 2 to 3 |
| alkylether sulfate | 5 to 15 | 5 to 15 | 6 to 13 | 7 to 11 |
| fatty acid | 4 to 12 | 4 to 12 | 4 to 12 | 6 to 10 |
| misc | up to 100 | up to 100 | up to 100 | up to 100 |

| | Formula 21 | Formula 22 | Formula 23 | Formula 24 |
|---|---|---|---|---|
| polyalkoxylated amine [1)] | 0.5 to 10 | 1 to 8 | 1 to 8 | 3 to 6 |
| polyalkoxylated polyalkyleneimine [2)] | 0.5 to 5 | 1 to 4 | 1 to 4 | 2 to 3 |
| alkylether sulfate | 5 to 15 | 5 to 15 | 6 to 13 | 7 to 11 |
| organic solvent | 15 to 40 | 15 to 40 | 20 to 35 | 20 to 35 |
| misc | up to 100 | up to 100 | up to 100 | up to 100 |

| | Formula 26 | Formula 27 | Formula 28 | Formula 29 |
|---|---|---|---|---|
| polyalkoxylated amine [1)] | 0.5 to 10 | 1 to 8 | 1 to 8 | 3 to 6 |
| polyalkoxylated polyalkyleneimine [2)] | 0.5 to 5 | 1 to 4 | 1 to 4 | 2 to 3 |
| alkylether sulfate | 5 to 15 | 5 to 15 | 6 to 13 | 7 to 11 |
| $C_{8-18}$ alkyl benzene sulphonate | <10 | <5 | <5 | <2 |
| non-ionic surfactant | 12 to 28 | 12 to 28 | 12 to 28 | 15 to 25 |
| fatty acid | 4 to 12 | 4 to 12 | 4 to 12 | 6 to 10 |
| organic solvent | 15 to 40 | 15 to 40 | 20 to 35 | 20 to 35 |
| misc | up to 100 | up to 100 | up to 100 | up to 100 |

| | Formula 31 | Formula 32 | Formula 33 | Formula 34 |
|---|---|---|---|---|
| polyalkoxylated amine [3)] | 0.5 to 10 | 1 to 8 | 1 to 8 | 3 to 6 |
| polyalkoxylated polyalkyleneimine [4)] | 0.5 to 5 | 1 to 4 | 1 to 4 | 2 to 3 |
| alkylether sulfate | 5 to 15 | 5 to 15 | 6 to 13 | 7 to 11 |
| misc | up to 100 | up to 100 | up to 100 | up to 100 |

| | Formula 36 | Formula 37 | Formula 38 | Formula 39 |
|---|---|---|---|---|
| polyalkoxylated amine [3)] | 0.5 to 10 | 1 to 8 | 1 to 8 | 3 to 6 |
| polyalkoxylated polyalkyleneimine [4)] | 0.5 to 5 | 1 to 4 | 1 to 4 | 2 to 3 |
| alkylether sulfate | 5 to 15 | 5 to 15 | 6 to 13 | 7 to 11 |
| $C_{8-18}$ alkyl benzene sulphonate | <10 | <5 | <5 | <2 |
| misc | up to 100 | up to 100 | up to 100 | up to 100 |

| | Formula 41 | Formula 42 | Formula 43 | Formula 44 |
|---|---|---|---|---|
| polyalkoxylated amine [3)] | 0.5 to 10 | 1 to 8 | 1 to 8 | 3 to 6 |
| polyalkoxylated polyalkyleneimine [4)] | 0.5 to 5 | 1 to 4 | 1 to 4 | 2 to 3 |
| alkylether sulfate | 5 to 15 | 5 to 15 | 6 to 13 | 7 to 11 |
| non-ionic surfactant | 12 to 28 | 12 to 28 | 12 to 28 | 15 to 25 |
| misc | up to 100 | up to 100 | up to 100 | up to 100 |

| | Formula 46 | Formula 47 | Formula 48 | Formula 49 |
|---|---|---|---|---|
| polyalkoxylated amine [3)] | 0.5 to 10 | 1 to 8 | 1 to 8 | 3 to 6 |
| polyalkoxylated polyalkyleneimine [4)] | 0.5 to 5 | 1 to 4 | 1 to 4 | 2 to 3 |
| alkylether sulfate | 5 to 15 | 5 to 15 | 6 to 13 | 7 to 11 |
| fatty acid | 4 to 12 | 4 to 12 | 4 to 12 | 6 to 10 |
| misc | up to 100 | up to 100 | up to 100 | up to 100 |

| | Formula 51 | Formula 52 | Formula 53 | Formula 54 |
|---|---|---|---|---|
| polyalkoxylated amine [3)] | 0.5 to 10 | 1 to 8 | 1 to 8 | 3 to 6 |
| polyalkoxylated polyalkyleneimine [4)] | 0.5 to 5 | 1 to 4 | 1 to 4 | 2 to 3 |
| alkylether sulfate | 5 to 15 | 5 to 15 | 6 to 13 | 7 to 11 |
| organic solvent | 15 to 40 | 15 to 40 | 20 to 35 | 20 to 35 |
| misc | up to 100 | up to 100 | up to 100 | up to 100 |

| | Formula 56 | Formula 57 | Formula 58 | Formula 59 |
|---|---|---|---|---|
| polyalkoxylated amine [3)] | 0.5 to 10 | 1 to 8 | 1 to 8 | 3 to 6 |
| polyalkoxylated polyalkyleneimine [4)] | 0.5 to 5 | 1 to 4 | 1 to 4 | 2 to 3 |
| alkylether sulfate | 5 to 15 | 5 to 15 | 6 to 13 | 7 to 11 |
| $C_{8-18}$ alkyl benzene sulphonate | <10 | <5 | <5 | <2 |
| non-ionic surfactant | 12 to 28 | 12 to 28 | 12 to 28 | 15 to 25 |
| fatty acid | 4 to 12 | 4 to 12 | 4 to 12 | 6 to 10 |
| organic solvent | 15 to 40 | 15 to 40 | 20 to 35 | 20 to 35 |
| misc | up to 100 | up to 100 | up to 100 | up to 100 |

| | Formula 61 | Formula 62 | Formula 63 | Formula 64 |
|---|---|---|---|---|
| polyalkoxylated amine [3)] | 0.5 to 10 | 1 to 8 | 1 to 8 | 3 to 6 |
| polyalkoxylated polyalkyleneimine [4)] | 0.5 to 5 | 1 to 4 | 1 to 4 | 2 to 3 |
| alkylether sulfate [5)] | 5 to 15 | 5 to 15 | 6 to 13 | 7 to 11 |
| misc | up to 100 | up to 100 | up to 100 | up to 100 |

| | Formula 66 | Formula 67 | Formula 68 | Formula 69 |
|---|---|---|---|---|
| polyalkoxylated amine [3)] | 0.5 to 10 | 1 to 8 | 1 to 8 | 3 to 6 |
| polyalkoxylated polyalkyleneimine [4)] | 0.5 to 5 | 1 to 4 | 1 to 4 | 2 to 3 |
| alkylether sulfate [5)] | 5 to 15 | 5 to 15 | 6 to 13 | 7 to 11 |
| $C_{8-18}$ alkyl benzene sulphonate | <10 | <5 | <5 | <2 |
| misc | up to 100 | up to 100 | up to 100 | up to 100 |

| | Formula 71 | Formula 72 | Formula 73 | Formula 74 |
|---|---|---|---|---|
| polyalkoxylated amine [3)] | 0.5 to 10 | 1 to 8 | 1 to 8 | 3 to 6 |
| polyalkoxylated polyalkyleneimine [4)] | 0.5 to 5 | 1 to 4 | 1 to 4 | 2 to 3 |
| alkylether sulfate [5)] | 5 to 15 | 5 to 15 | 6 to 13 | 7 to 11 |
| non-ionic surfactant | 12 to 28 | 12 to 28 | 12 to 28 | 15 to 25 |
| misc | up to 100 | up to 100 | up to 100 | up to 100 |

| | Formula 76 | Formula 77 | Formula 78 | Formula 79 |
|---|---|---|---|---|
| polyalkoxylated amine [3)] | 0.5 to 10 | 1 to 8 | 1 to 8 | 3 to 6 |
| polyalkoxylated polyalkyleneimine [4)] | 0.5 to 5 | 1 to 4 | 1 to 4 | 2 to 3 |
| alkylether sulfate [5)] | 5 to 15 | 5 to 15 | 6 to 13 | 7 to 11 |
| fatty acid | 4 to 12 | 4 to 12 | 4 to 12 | 6 to 10 |
| misc | up to 100 | up to 100 | up to 100 | up to 100 |

| | Formula 81 | Formula 82 | Formula 83 | Formula 84 |
|---|---|---|---|---|
| polyalkoxylated amine [3)] | 0.5 to 10 | 1 to 8 | 1 to 8 | 3 to 6 |
| polyalkoxylated polyalkyleneimine [4)] | 0.5 to 5 | 1 to 4 | 1 to 4 | 2 to 3 |
| alkylether sulfate [5)] | 5 to 15 | 5 to 15 | 6 to 13 | 7 to 11 |
| organic solvent | 15 to 40 | 15 to 40 | 20 to 35 | 20 to 35 |
| misc | up to 100 | up to 100 | up to 100 | up to 100 |

| | Formula 86 | Formula 87 | Formula 88 | Formula 89 |
|---|---|---|---|---|
| polyalkoxylated amine [3)] | 0.5 to 10 | 1 to 8 | 1 to 8 | 3 to 6 |
| polyalkoxylated polyalkyleneimine [4)] | 0.5 to 5 | 1 to 4 | 1 to 4 | 2 to 3 |
| alkylether sulfate [5)] | 5 to 15 | 5 to 15 | 6 to 13 | 7 to 11 |
| $C_{8-18}$ alkyl benzene sulphonate | <10 | <5 | <5 | <2 |
| non-ionic surfactant | 12 to 28 | 12 to 28 | 12 to 28 | 15 to 25 |
| fatty acid | 4 to 12 | 4 to 12 | 4 to 12 | 6 to 10 |
| organic solvent | 15 to 40 | 15 to 40 | 20 to 35 | 20 to 35 |
| misc | up to 100 | up to 100 | up to 100 | up to 100 |

| | Formula 91 | Formula 92 | Formula 93 | Formula 94 |
|---|---|---|---|---|
| polyalkoxylated amine [3] | 0.5 to 10 | 1 to 8 | 1 to 8 | 3 to 6 |
| polyalkoxylated polyalkyleneimine [4] | 0.5 to 5 | 1 to 4 | 1 to 4 | 2 to 3 |
| alkylether sulfate [5] | 5 to 15 | 5 to 15 | 6 to 13 | 7 to 11 |
| $C_{8-18}$ alkyl benzene sulphonate | <10 | <5 | <5 | <2 |
| non-ionic surfactant | 12 to 28 | 12 to 28 | 12 to 28 | 15 to 25 |
| fatty acid | 4 to 12 | 4 to 12 | 4 to 12 | 6 to 10 |
| enzyme preparation | 2 to 8 | 2 to 8 | 2 to 8 | 3 to 6 |
| organic solvent | 15 to 40 | 15 to 40 | 20 to 35 | 20 to 35 |
| water | 5 to 18 | 5 to 18 | 5 to 18 | 7 to 12 |
| misc | up to 100 | up to 100 | up to 100 | up to 100 |

[1] polyalkoxylated amine having a weight-average molecular weight $M_w$ in the range from 600 g/mol to 10000 g/mol, which is obtainable by reacting ammonia or primary alkyl or hydroxyalkylamines having a molecular weight of less than 200 g/mol, with alkylene oxides

[2] polyalkoxylated polyalkyleneimine obtainable by reacting polyalkyleneimines with alkylene oxides

[3] polyalkoxylated amine having a weight-average molecular weight $M_w$ in the range from 1400 g/mol to 4500 g/mol, which is obtainable by reacting ammonia or primary alkyl or hydroxyalkylamines having a molecular weight of less than 200 g/mol, with alkylene oxides, the polyalkoxylated amines satisfying the general formula (I), (I)

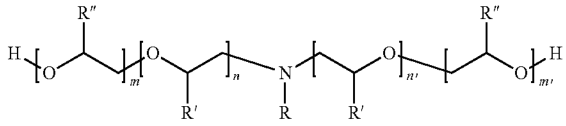

in which R represents a linear, optionally branched or optionally cyclic alkyl group comprising 1 to 12 C atoms or a group —$(CH_2CHR'O)_n$—$(CH_2CHR''O)_{m''}$—H, R' and R" are, independently of one another, H, $CH_3$ or $CH_2CH_3$, n, n' and n" are, independently of one another, numbers from 0 to 30, preferably from 0 to 10 and in particular 0 to 5, and m, m' and m" are, independently of one another, numbers from 0 to 30, preferably from 5 to 20 and in particular from 12 to 16, with the proviso that the sum n+n'+n"+m+m'+m" is at least 14, preferably in the range from 18 to 100, and in particular in the range from 20 to 70. Preferably, in the compounds of the formula I, at least one of the functional groups R' and R" is a $CH_3$ group.

The previously described material systems are suitable not only for ensuring simple producibility, a good storage life and cleaning performance, but also enable the realization of a product appearance which is attractive to the consumer. For example, detergent preparations which are transparent and consequently have low turbidity are perceived as optically attractive. Preferred detergent preparations therefore have a turbidity (HACH Turbidimeter 2100Q, 20° C., 10 ml cuvette) below 100 NTU, preferably below 50 NTU, and in particular below 20 NTU. In the case of an NTU value (at 20° C.) of 60 or more, molded bodies exhibit a perceptible turbidity, within the meaning of the invention, identifiable by the naked eye.

The preparations which have a cloudy-white appearance are a further group of detergent preparations perceived as visually attractive. The turbidity (HACH Turbidimeter 2100 Q, 20° C., 10 ml cuvette) of corresponding preferred detergent preparations is above 100 NTU and in particular above 400 NTU. Corresponding compositions preferably comprise an opacifier from the group of the styrene-acrylate copolymers (INCI: Styrene/Acrylates Copolymer) and the inorganic salts, in particular from the group of the inorganic salts.

The Nephelometry Turbidity Unit (NTU) is frequently used as a measurement value for transparency. It is, for example, a unit used in water treatment for turbidity measurements, for example in liquids. It is the unit of turbidity measured with a calibrated nephelometer. High NTU values are measured for clouded compositions, whereas low values are determined for clear compositions.

In this case, the turbidimeter of the type HACH Turbidimeter 2100 Q by Hach Company, Loveland, Colorado (USA) is used using the calibration substances StabICal Solution HACH (20 NTU), StabICal Solution HACH (100 NTU) and StabICal Solution HACH (800 NTU), all of which can also be ordered from the Hach Company. For the measurement, a 10 ml measuring cuvette comprising a cap is filled with the composition to be investigated, and the measurement is carried out at 20° C.

The optical advantages of the concentrated detergent preparations come to bear in particular in packaging agents, which are in turn transparent and enable a direct view of the detergent composition. In addition to transparent plastic bottles, transparent bags, in particular water-soluble transparent bags, are therefore preferred for manufacturing and packaging.

A further preferred subject matter of this application is therefore a detergent portion unit comprising i) a detergent preparation according to the invention ii) a water-soluble film which completely surrounds the detergent preparation.

The water-soluble film in which the detergent preparation is packaged can comprise one or more structurally different water-soluble polymer(s). Suitable water-soluble polymer(s) are in particular polymers from the group of (optionally acetalized) polyvinyl alcohols (PVAL) and copolymers thereof.

Water-soluble films are preferably based on a polyvinyl alcohol or a polyvinyl alcohol copolymer, the molecular weight of which is in the range from 10,000 to 1,000,000 $gmol^{-1}$, preferably from 20,000 to 500,000 $gmol^{-1}$, particularly preferably from 30,000 to 100,000 $gmol^{-1}$, and in particular from 40,000 to 80,000 $gmol^{-1}$.

The production of the polyvinyl alcohol and polyvinyl alcohol copolymers generally includes the hydrolysis of intermediate polyvinyl acetate. Preferred polyvinyl alcohols and polyvinyl alcohol copolymers have a degree of hydrolysis 70 to 100 mol. %, preferably 80 to 90 mol. %, particularly preferably 81 to 89 mol. %, and in particular 82 to 88 mol. %.

Preferred polyvinyl alcohol copolymers include, in addition to vinyl alcohol, an ethylenically unsaturated carboxylic acid, or the salt or ester thereof. In addition to vinyl alcohol, such polyvinyl alcohol copolymers particularly preferably contain sulfonic acids such as 2-acrylamido-2-methyl-1-propanesulfonic acid (AMPS), acrylic acid, methacrylic acid, acrylic esters, methacrylic esters or mixtures thereof; among the esters, preference is given to C1-4-alkyl esters or hydroxyalkyl esters. Ethylenically unsaturated dicarboxylic acids, for example itaconic acid, maleic acid, fumaric acid and mixtures thereof, are possible as further monomers.

Suitable water-soluble films for use are marketed, inter alia, by the company MonoSol LLC, for example under the name M8630, M8720, M8310, C8400 or M8900. For example, films with the name Solublon® PT, Solublon® GA, Solublon® KC or Solublon® KL by Aicello Chemical Europe GmbH or the VF-HP films by Kuraray are also suitable.

The water-soluble films can contain additional active ingredients or fillers, but also plasticizers and/or solvents, in particular water, as further ingredients.

In this case, the group of the further active ingredients includes, for example, materials which protect the ingredients of the preparation which are surrounded by the film material, from decomposition or deactivation by light irradiation. Antioxidants, UV absorbers and fluorescent dyes have proven to be particularly suitable here.

As plasticizers, it is possible to use, for example, glycerol, ethylene glycol, diethylene glycol, propanediol, 2-methyl-1,3-propanediol, sorbitol or mixtures thereof.

To reduce the coefficients of friction thereof, the surface of the water-soluble film of the detergent portion unit can optionally be powder-coated with fine powder. Sodium aluminosilicate, silicon dioxide, talc and amylose are examples of suitable powdering agents.

Preferred water-soluble films are suitable for processing in a deep-drawing apparatus.

The volume of the detergent portion unit is preferably from 12 to 22 ml, in particular from 12 to 18 ml.

Detergent portion unit according to one of the preceding points, wherein the detergent portion unit has one to four receiving chambers, preferably three or four receiving chambers. In detergent portion units having two or more receiving chambers, preferably at least one of the receiving chambers, preferably the plurality of receiving chambers, is transparent.

A further subject matter of the application is a method for cleaning textiles, in which a previously described detergent preparation or detergent portion unit is introduced into the washing liquor of a textile washing machine.

In preferred method variants, the detergent preparation or the detergent portion unit is metered directly into the drum or into the detergent drawer of the textile washing machine.

The machine textile washing process is preferably carried out at temperatures of 20° C. to 60° C., preferably of 30° C. to 45° C.

This application provides, inter alia, the following subjects:

1. Flowable detergent preparation including, based on the total weight thereof,
   a) 0.5 to 10 wt. % of a polyalkoxylated amine having a weight-average molecular weight $M_w$ in the range from 600 g/mol to 10000 g/mol, which is obtainable by reacting ammonia or primary alkyl or hydroxyalkylamines having a molecular weight of less than 200 g/mol with alkylene oxides;
   b) 0.5 to 5 wt. % polyalkoxylated polyalkyleneimine obtainable by reacting polyalkyleneimines with alkylene oxides;
   c) 5 to 15 wt. % alkyl ether sulfate.
2. Detergent preparation according to point 1, wherein the detergent preparation includes, based on the total weight thereof, 1 to 8 wt. %, preferably 3 to 6 wt. %, polyalkoxylated amine.
3. Detergent preparation according to one of the preceding points, wherein the polyalkoxylated amine has a weight-average molecular weight $M_w$ in the range from 1300 g/mol to 6000 g/mol, in particular from 1400 g/mol to 4500 g/mol.
4. Detergent preparation according to one of the preceding points, wherein the detergent preparation includes, based on the total weight thereof, 1 to 4 wt. %, preferably 2 to 3 wt. %, polyalkoxylated polyalkyleneimine.
5. Detergent preparation according to one of the preceding points, wherein the polyalkoxylated polyalkyleneimine has a weight-average molecular weight $M_w$ in the range from 5000 g/mol to 60000 g/mol, in particular from 10000 g/mol to 22500 g/mol.
6. Detergent preparation according to one of the preceding points, wherein the detergent preparation includes a polyethoxylated polyethyleneimine as polyalkoxylated polyalkyleneimine.
7. Detergent preparation according to one of the preceding points, wherein the polyalkyleneimine has primary amino groups at its ends and secondary amino groups in the interior of the molecule, and the ratio of primary to secondary amino groups in the polyalkyleneimine is in the range from 1:0.5 to 1:1.5, in particular in the range from 1:0.7 to 1:1.
8. Detergent preparation according to one of the preceding points, wherein the polyalkyleneimine has primary amino groups at its ends and secondary amino groups inside the molecule, and the average number of alkoxy groups per primary and secondary amino function in the polyalkoxylated polyalkyleneimine is 5 to 100, in particular 10 to 50.
10. Detergent preparation according to one of the preceding points, wherein the weight ratio of polyalkoxylated amine to polyalkoxylated polyalkyleneimine is 10:1 to 1:3, preferably 3.1 to 1:1.
11. Detergent preparation according to one of the preceding points, wherein the detergent preparation includes, based on the total weight thereof, 6 to 13 wt. %, preferably 7 to 11 wt. %, alkylether sulfate.
12. Detergent preparation according to one of the preceding points, wherein the detergent preparation includes, as an alkylether sulfate, a fatty alcohol ether sulfate, preferably a fatty alcohol ether sulfate selected from fatty alcohol ether sulfates of formula $R^1$—O-$(AO)_n$—$SO_3^-X^+$ (II), where $R^1$=linear C12-18-alkyl, n=2, 3, 4, 5, 6, 7 or 8, and $X^+$=$Na^+$ or $HOCH_2CH_2NH_3^+$.
13. Detergent preparation according to one of the preceding points, wherein the detergent preparation includes, as an alkylether sulfate, a fatty alcohol ether sulfate selected from fatty alcohol ether sulfates of formula $R^1$—O-$(AO)_n$—$SO_3^-X^+$ (II), where $R^1$=linear $C_{12-18}$-alkyl, n=2, 3, 4, 5, 6, 7 or 8 and $X^+$=$Na^+$ or $HOCH_2CH_2NH_3^+$, in particular from the group of the Na fatty alcohol ether sulfates or monoethanolamine fatty alcohol ether sulfates where $R^1$=linear C12-18-alkyl and n=2.

14. Detergent preparation according to one of the preceding points, wherein the detergent preparation, based on the total weight thereof, includes less than 10 wt. %, preferably less than 5 wt. %, and in particular less than 2 wt. % $C_{8-18}$-alkylbenzene sulfonates.
15. Detergent preparation according to one of the preceding points, wherein the detergent preparation includes, based on the total weight thereof, 12 to 28 wt. %, preferably 15 to 25 wt. %, non-ionic surfactant.
16. Detergent preparation according to point 15, wherein the non-ionic surfactant is selected from the group of ethoxylated primary $C_{8-18}$-alcohols, preferably the ethoxylated primary $C_{8-18}$-alcohols having a degree of alkoxylation of ≥4, more preferably of the $C_{12-14}$-alcohols having 4 EO or 7 EO, the $C_{9-11}$ alcohols having 7 EO, the $C_{13-15}$ alcohols having 5 EO, 7 EO or 8 EO, the $C_{13-15}$ oxo alcohols having 7 EO, the $C_{12-18}$ alcohols having 5 EO or 7 EO, in particular the $C_{12-18}$ fatty alcohols having 7 EO, or the $C_{13-15}$ oxo alcohols having 7 EO.
17. Detergent preparation according to one of the preceding points, wherein the detergent preparation includes non-ionic surfactant and anionic surfactant in a weight ratio of from 4:1 to 1:1, preferably from 3:1 to 2:1.
18. Detergent preparation according to one of the preceding points, wherein the detergent preparation includes, based on the total weight thereof, 4 to 12 wt. %, preferably 6 to 10 wt. %, fatty acid.
19. Detergent preparation according to point 18, wherein the fatty acid is selected from the group of caprylic acid, capric acid, lauric acid, myristic acid, palmitic acid, stearic acid, oleic acid, linoleic acid and mixtures thereof
20. Detergent preparation according to one of the preceding points, wherein the detergent preparation includes, based on the total weight thereof, 15 to 45 wt. %, preferably 25 to 45 wt. %, solvent.
21. Detergent preparation according to one of the preceding points, wherein the detergent preparation includes, based on the total weight thereof, 15 to 40 wt. %, preferably 20 to 35 wt. %, organic solvent.
22. Detergent preparation according to point 21, wherein the organic solvent is selected from the group of ethanol, n-propanol, i-propanol, butanols, glycol, propanediol, butanediol, methylpropanediol, glycerol, diglycol, propyl diglycol, butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether, propylene glycol propyl ether, dipropylene glycol monomethyl ether, dipropylene glycol monoethyl ether, methoxytriglycol, ethoxytriglycol, butoxytriglycol, 1-butoxyethoxy-2-propanol, 3-methyl-3-methoxybutanol, propylene glycol tert-butyl ether, di-n-octyl ether and mixtures thereof, preferably from the group of propanediol, glycerol, ethanol and mixtures thereof.
23. Detergent preparation according to one of the preceding points, wherein the detergent preparation includes, based on the total weight thereof, 5 to 18 wt. %, preferably 7 to 12 wt. %, water.
24. Detergent preparation according to one of the preceding points, wherein the detergent preparation includes, based on the total weight thereof, 2 to 8 wt. %, preferably 3 to 6 wt. %, enzyme preparation.
25. Detergent preparation according to one of the preceding points, wherein the detergent preparation includes, based on the total weight thereof, 0.2 to 4 wt. %, preferably 0.5 to 3 wt. %, fragrance preparation.
26. Detergent preparation according to one of the preceding points, wherein the detergent preparation has a turbidity (HACH Turbidimeter 2100 Q, 20° C., 10 ml cuvette) below 100 NTU, preferably below 50 NTU, and in particular below 20 NTU.
27. Detergent portion unit comprising, a detergent preparation according to one of points 1 to 26 and a water-soluble film which completely surrounds the detergent preparation.
28. Detergent portion unit according to point 27, wherein the detergent portion unit has a volume of 12 to 22 ml, preferably 12 to 18 ml.
29. Detergent portion unit according to one of the preceding points, wherein the detergent portion unit has one to four receiving chambers, preferably three or four receiving chambers.
30. Method for textile cleaning, in which a detergent preparation according to one of points 1 to 26 or a detergent portion unit according to one of points 27 to 29 is introduced into the washing liquor of a textile washing machine.

EXAMPLES

Textile fabrics were provided with standardized impurities and subsequently washed at 40° C. in washing liquors which contained 1 g/l of a detergent V1 to V3 or E1. After washing, the textiles were dried. The brightness values of the cleaned textiles were determined. The stated values were obtained as mean values from five washing experiments.

TABLE 1

| Detergent composition (wt. %) | | | | |
|---|---|---|---|---|
| | V1 | V2 | V3 | E1 |
| 1,2-propanediol | 6.0 | 6.0 | 6.0 | 6.0 |
| glycerol | 24 | 21.4 | 19.5 | 16.9 |
| ethanol | 3.2 | 3.2 | 3.2 | 3.2 |
| water | 10.0 | 10.0 | 10.0 | 10.0 |
| monoethanolamine | 4.0 | 4.0 | 4.0 | 4.0 |
| Na-lauryl ether sulfate (2EO) | 9.0 | 9.0 | 9.0 | 9.0 |
| fatty acid | 9.0 | 9.0 | 9.0 | 9.0 |
| 012-18 fatty alcohol ethoxylate (7EO) | 24 | 24 | 24 | 24 |
| polyalkoxylated alkanolamine | — | — | 4.5 | 4.5 |
| polyalkoxylated polyalkyleneimine | — | 2.6 | — | 2.6 |
| DTPMP Na salt | 0.5 | 0.5 | 0.5 | 0.5 |
| optical brightener | 0.5 | 0.5 | 0.5 | 0.5 |
| perfume | 1.0 | 1.0 | 1.0 | 1.0 |
| enzyme preparation | 3.5 | 3.5 | 3.5 | 3.5 |
| misc | up to 100 | up to 100 | up to 100 | up to 100 |

TABLE 2

| Brightness value differences (Y values) | | | | | |
|---|---|---|---|---|---|
| Spot | Textile | V1 | V2 | V3 | E1 |
| red wine | cotton | 76.5 | 76.8 | 76.7 | 77.5 |
| blood, milk, ink | cotton | 35.6 | 36.3 | 35.6 | 37.1 |
| pectin, carbon black | cotton | 44.7 | 45.1 | 45.0 | 46.0 |
| tea | cotton | 45.8 | 46.7 | 45.7 | 47.6 |

What is claimed is:

1. A flowable detergent preparation comprising, based on the total weight thereof:

0.5 to 10 wt. % of a polyalkoxylated amine having a weight-average molecular weight Mw in the range from 600 g/mol to 10000 g/mol, the polyalkoxylated amine obtained by reacting ammonia or primary alkyl or hydroxyalkylamines having a molecular weight of less than 200 g/mol with alkylene oxides;

0.5 to 5 wt. % polyethoxylated polyalkyleneimine, which is obtained by reacting polyalkyleneimines with alkylene oxides;

5 to 15 wt. % alkyl ether sulfate;

15 to 28 wt. % of a nonionic surfactant;

4 to 12 wt. % of a fatty acid; and 5 to 18 wt. % water.

2. The detergent preparation of claim 1, wherein the detergent preparation comprises, based on the total weight thereof, 1 to 8 wt. % of the polyalkoxylated amine.

3. The detergent preparation of claim 2, wherein the detergent preparation comprises, based on the total weight thereof, 3 to 6 wt. % of the polyalkoxylated amine.

4. The detergent preparation of claim 1, wherein the detergent preparation comprises, based on the total weight thereof, 1 to 4 wt. % polyethoxylated polyalkyleneimine.

5. The detergent preparation of claim 4, wherein the detergent preparation comprises, based on the total weight thereof, 2 to 3 wt. %, polyethoxylated polyalkyleneimine.

6. The detergent preparation of claim 1, wherein the detergent preparation comprises, based on the total weight thereof, 6 to 13 wt. % alkyl ether sulfate.

7. The detergent preparation of claim 6, wherein the detergent preparation comprises, based on the total weight thereof, 7 to 11 wt. % alkyl ether sulfate.

8. The detergent preparation of claim 1, wherein the weight ratio of the polyalkoxylated amine to the polyethoxylated polyalkyleneimine is from 10:1 to 1:3.

9. The detergent preparation of claim 8, wherein the weight ratio of the polyalkoxylated amine to the polyethoxylated polyalkyleneimine is from 3.1 to 1:1.

10. The detergent preparation of claim 1, wherein the detergent preparation further comprises, based on the total weight thereof, 15 to 45 wt. % of a solvent.

11. The detergent preparation of claim 10, wherein the detergent preparation comprises, based on the total weight thereof, 25 to 45 wt. % of the solvent.

12. The detergent preparation of claim 1, wherein the detergent preparation further comprises, based on the total weight thereof, less than 10 wt. % $C_{8-18}$-alkylbenzene sulfonates.

13. The detergent preparation of claim 12, wherein the detergent preparation comprises, based on the total weight thereof, less than 5 wt. % $C_{8-18}$-alkylbenzene sulfonates.

14. The detergent preparation of claim 13, wherein the detergent preparation comprises, based on the total weight thereof, less than 2 wt. % $C_{8-18}$-alkylbenzene sulfonates.

15. A method for textile cleaning, the method comprising introducing the detergent preparation of claim 1 into a washing liquor of a textile washing machine.

16. The method for textile cleaning of claim 15, wherein the detergent preparation is completely surrounded by a water-soluble film prior to introducing the detergent preparation into the washing liquor of the textile washing machine.

17. A detergent portion unit comprising:

i) a detergent preparation comprising, based on the total weight thereof:

0.5 to 10 wt. % of a polyalkoxylated amine having a weight-average molecular weight Mw in the range from 600 g/mol to 10000 g/mol, the polyalkoxylated amine obtained by reacting ammonia or primary alkyl or hydroxyalkylamines having a molecular weight of less than 200 g/mol with alkylene oxides;

0.5 to 5 wt. % polyethoxylated polyalkyleneimine, which is obtained by reacting polyalkyleneimines with alkylene oxides;

5 to 15 wt. % alkyl ether sulfate;

15 to 28 wt. % of a nonionic surfactant;

4 to 12 wt. % of a fatty acid; and 5 to 18 wt. % water; and ii) a water-soluble film completely surrounding the detergent preparation.

18. The detergent portion unit of claim 17, wherein the detergent portion unit has a volume of from 12 to 22 ml.

19. The detergent portion unit of claim 18, wherein the detergent portion unit has a volume of from 12 to 18 ml.

20. The detergent portion unit of claim 17, wherein the detergent preparation further comprises, based on the total weight thereof, 15 to 45 wt. % of a solvent.

* * * * *